(12) United States Patent
Nine et al.

(10) Patent No.: US 6,560,611 B1
(45) Date of Patent: May 6, 2003

(54) METHOD, APPARATUS, AND ARTICLE OF MANUFACTURE FOR A NETWORK MONITORING SYSTEM

(75) Inventors: Harmon Nine, Dearborn, MI (US); Sandy C. Kronenberg, Franklin, MI (US)

(73) Assignee: Netarx, Inc., Bingham Farms, MI (US)

( * ) Notice: Subject to any disclaimer, the term of this patent is extended or adjusted under 35 U.S.C. 154(b) by 0 days.

(21) Appl. No.: 09/416,079

(22) Filed: Sep. 23, 1999

Related U.S. Application Data
(60) Provisional application No. 60/103,973, filed on Oct. 13, 1998.

(51) Int. Cl.[7] .................... G06F 17/30; G06F 15/173; G06F 17/00
(52) U.S. Cl. .................. 707/104.1; 709/238; 709/224
(58) Field of Search ................. 707/1–3, 104.1, 707/4, 8, 10, 102, 203; 705/1–7, 434, 365, 11, 30–34; 379/112–114, 201–230, 112.05, 114.08–114.17, 265.06; 709/200–245, 229–304; 370/230, 410–426; 345/710

(56) References Cited

U.S. PATENT DOCUMENTS

| | | | | |
|---|---|---|---|---|
| 5,590,181 A | * | 12/1996 | Hogan et al. | 379/114 |
| 5,999,908 A | * | 12/1999 | Abelow | 705/1 |
| 6,115,040 A | * | 9/2000 | Bladow et al. | 345/335 |
| 6,185,598 B1 | * | 2/2001 | Farber et al. | 709/200 |
| 6,370,583 B1 | * | 4/2002 | Fishler et al. | 709/238 |

* cited by examiner

*Primary Examiner*—Safet Metjahic
*Assistant Examiner*—Te Yu Chen

(57) ABSTRACT

Methods and systems consistent with the present invention solve the limitations of current monitoring systems by automatically and completely monitoring various networks devices and services. Specifically, a network monitoring system monitors all services and conditions on various networks. Moreover, the network monitoring system may provide an advance warning of potential failures and may diagnose any problems that may surface.

17 Claims, 11 Drawing Sheets

```
<!DOCTYPE TICKET[

<!ELEMENT TICKET - O RCDATA>
<!ATTLIST TICKET    company-name  CDATA  #FIXED   "ABC CORP"
                    submitted-by  CDATA  ,,,,#REQUIRED
                    ip-address    CDATA  ,,,,
                    service       CDATA  ,,,,
                    desire        (report, repair-problem, new-purchase, info-question)#REQUIRED>
]>

<TICKET submitted-by = "nms-205.164.209.141" ip-address = "205.164.209.129"
service = "ping" desire = repair-problem>
205.164.209.129 ping 0->2
</TICKET>
```

FIG. 6

| DATE | TECHNICIAN | TICKET NO. | DIAGNOSIS |
|---|---|---|---|
| 10/1/99 | John | 01101101 | HTTPD SERVICE |
| 10/1/99 | John | 01101111 | ERROR IN SECURITY LOG |
| 10/1/99 | Bob | 01102222 | TEMP TOO HIGH |
| 10/1/99 | Bob | 01102111 | UNUSUAL ICMP TRAFFIC |

METHOD, APPARATUS, AND ARTICLE OF MANUFACTURE FOR A NETWORK MONITORING SYSTEM

RELATED DOCUMENTS

Provisional U.S. Patent application No. 60/103,973 pending, entitled "Method, Apparatus, and Article Of Manufacture For A Network Monitoring System," filed Oct. 13, 1998 is relied upon and is incorporated by reference in this application.

BACKGROUND OF THE INVENTION

A. Field of the Invention

This invention relates generally to network monitoring systems and, more specifically, a method for monitoring mission critical network infrastructures and providing application support for client networks.

B. Description of the Related Art

As we approach the new millennium, computer networks have migrated from single server systems to mission critical network infrastructures. A mission critical network infrastructure is a network that runs an electronic commerce site or provides real time data to a plurality of users. These network infrastructures generally must remain online at all times and can afford little or no down time. Devices on these networks usually are comprised of many different types and brands of network devices, such as Windows NT servers, Unix servers, routers, and terminal servers. For example, if, per chance, the Unix billing system were to fail, quite possibly, an entire electronic commerce site could lose large sums of money.

What makes maintaining these systems even harder is the fact that the devices on the network are generally proprietary and do not conform with any one standard. For example, to configure a firewall from outside a private network, a nonstandard port may be used, such as port 2058. In fact, even devices that use standard ports sometimes use different methods to indicate availability. For example, a router may use well-known SNMP traps to indicate availability, whereas a well-known telnet server provides a "login" prompt when a client connects to a port 23. Moreover, if a network contains 50 telnet servers, even though they respond the same way, monitoring each one becomes an arduous task.

Although current monitoring systems can monitor a particular machine or service, currently there is no way to monitor entire networks efficiently. With large mission critical networks, even if the administrator ultimately locates a problem with a device or service, it may take some time for the administrator to determine the cause of the problem.

It is therefore desirable to improve existing network monitoring systems.

SUMMARY OF THE INVENTION

Methods and systems consistent with the present invention solve the limitations of current monitoring systems by automatically and completely monitoring various networks devices and services. Specifically, a network monitoring system monitors all services and conditions on various networks. Moreover, the network monitoring system provides advance warnings of potential failures by examining log files and may diagnose any problems that may surface.

In accordance with methods and systems consistent with the present invention, a method is provided for monitoring a network with at least one service on the network. The method spawns a process for each one of the services to monitor, and monitors a service with the spawned process. When a problem is detected with the service, the method notifies an accounting server.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 6 depicts a ticket in accordance with methods and systems consistent with the present invention;

FIG. 8 depicts a sample report created by the reporting software in accordance with methods and systems of the present invention.

DETAILED DESCRIPTION

Figure 1:
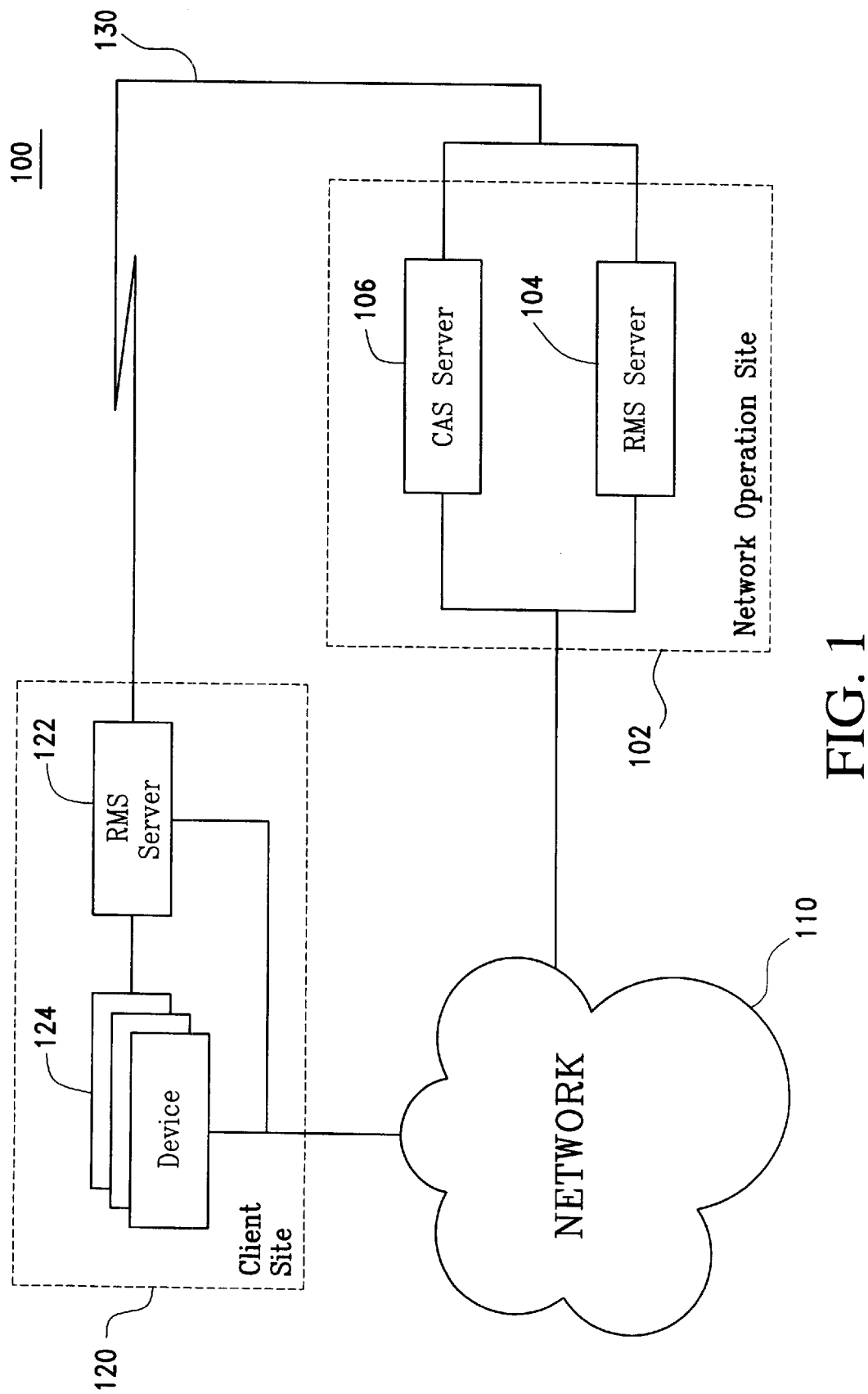
FIG. 1 depicts a data processing system suitable for practicing methods and systems consistent with the present invention.

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Introduction

To effectively provide application support, monitor networks, and relay pertinent information regarding various networks to a Network Operation Site (NOS), the network monitoring system contains many Remote Monitoring System (RMS) servers and a Central Accounting System (CAS) server. An RMS server is placed at a client site and is responsible for monitoring various network services, such as http, ftp, dns, nntp, smtp, snmp, environmental conditions, such as power status, temperature, humidity, and security services, such as authentication, intrusion detection, firewalls, encryption, unauthorized devices on the network and network traffic.

To monitor a service or environmental condition, the RMS server contains software that may communicate with the service or sensors. The software spawns a copy of itself for each service or sensor that the RMS is configured to monitor. Thus, if five web servers are to be monitored, the RMS will spawn and maintain five copies of the software. To monitor a security service on the network, the RMS server may examine various log files to send to the CAS for dispatch. The RMS server may receive a log file by a remote logging program located on the monitored device.

Each spawned software continuously monitors the corresponding service. If the software detects that a service is not responding or that an anomaly has occurred with the service, the RMS server sends information regarding the non-responding service or a daily network traffic report to the NOS as a ticket. A ticket is a data record containing information about the service, such as location, severity of the problem, and time of occurrence. For example, the ticket may be an SGML document.

The RMS server may communicate with the NOC through the Internet. However, if the RMS server is unable to contact the NOC through the Internet, the RMS server may use some other out-of-band means, such as a direct telephone connection.

When a message is sent to the NOC, a CAS server determines the nature of the problem, and notifies the proper personnel. For example, a technician may be notified by a page or electronic mail. The CAS may also store all tickets for later retrieval, such as for creating reports.

To ensure that the RMS servers are operational, an additional RMS server may be placed at the NOC to monitor RMS servers at client sites. This RMS server monitors the connection between each RMS server at client sites and the NOC. If a problem is detected with one of the RMS servers at a client site, as mentioned before, the CAS may notify the proper personnel.

To store the data necessary for the RMS server and CAS server to perform their respective functions, a uniform standard data format may be employed, such as Standard Generalized Markup Language (SGML) or Extended Markup Language (XML). These languages provide efficient and flexible formats for storing data. In particular, unlike standard databases, the format can be modified quickly and easily to accommodate system updates and improvements. To process the data, any computer language may be used, such as Practical Extraction and Report Language (PERL). PERL is object-oriented, and provides a module for parsing and accessing SGML or XML data.

System Components

FIG. 1 depicts a data processing system 100 suitable for practicing methods and systems consistent with the present invention. Data processing system 100 includes a Remote Monitoring System (RMS) Server 104 and a Central Accounting System (CAS) Server 106 at the network operation site 102. RMS server 104 monitors the status of the RMS server at client site 120. CAS server 106 receives and stores tickets and passes the ticket to diagnose the problem and dispatch personnel if necessary.

At client site 120 is a RMS server 122 and various devices 124, such as routers, servers, or hubs. RMS server 104 and CAS server 106 communicate with RMS server 122 through network 102, such as the Internet. RMS server 122 submits information regarding the status of device 124 to CAS server 106. Although one client site is depicted, one skilled in the art will appreciate that many client sites may exist. Also, one skilled in the art will appreciate that multiple RMS servers may monitor various devices. In case of network 110 failure, RMS server 122 may also communicate with network operation site 102 with an out-of-band communication network 130, such as a POTS line. One skilled in the art will appreciate that CAS server 106 or RMS server 104 may be included at client site 120.

Figure 2A:
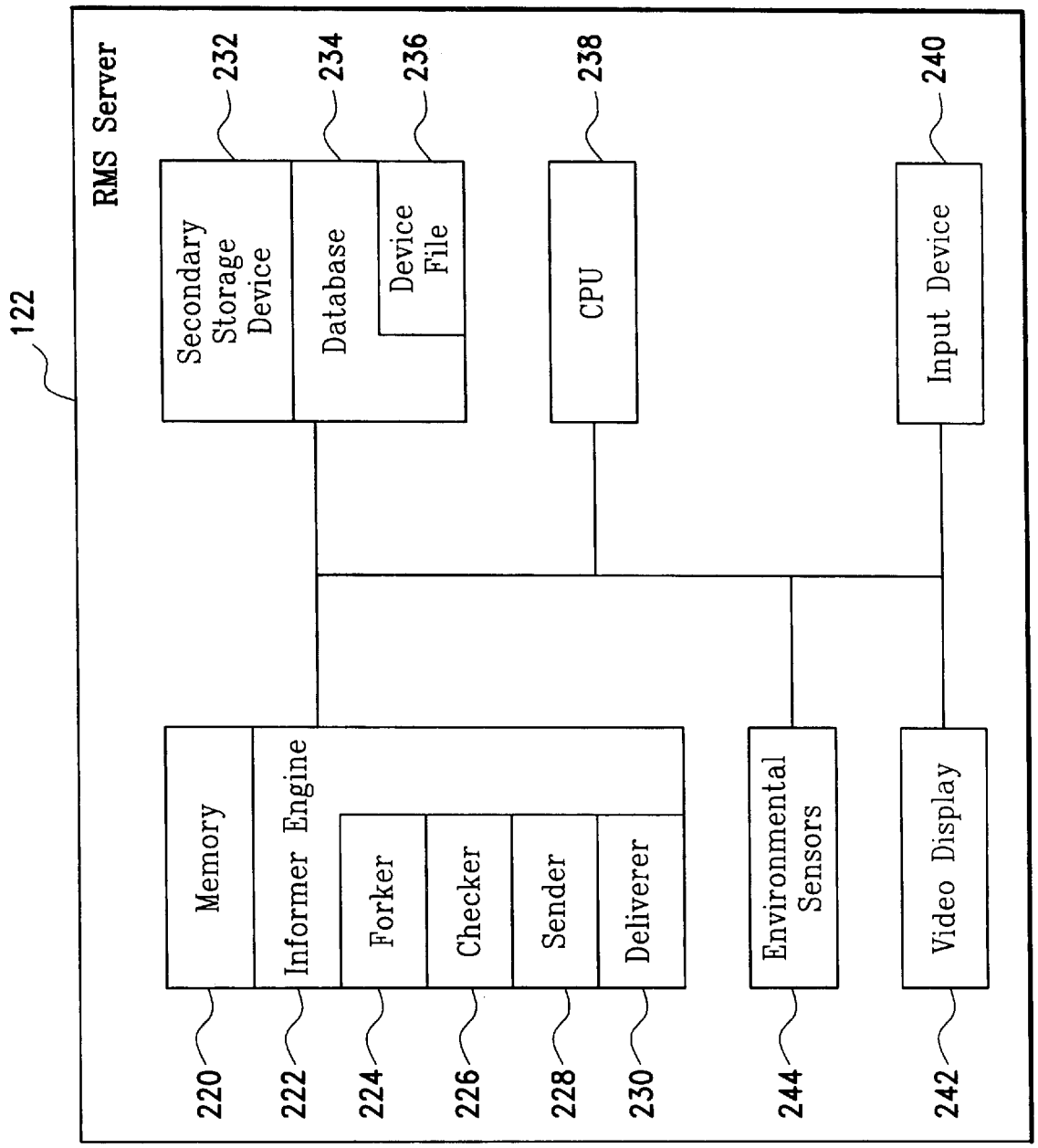
FIG. 2A depicts a more detailed diagram of an RMS server depicted in FIG. 1.

FIG. 2A depicts a more detailed diagram of RMS 122. RMS 122 contains a memory 220, a secondary storage device 232, a central processing unit ("CPU") 238, an input device 240, a video display 242, and environmental sensors 244. Memory 220 includes informer engine 222 that responds to information queries from various softwares associated with informer engine 222. Included in informer engine 222 are forker software 224 that uses well-known Unix fork commands to spawn copies of other softwares, checker software 226 that monitors devices and communicates with informer engine 222 to receive additional information regarding the device, sender software that spawns deliverer software 230 when a problem on client network 120 is detected, and deliverer software 230 that transmits a message to CAS 106 when a problem is detected on client network 120.

Each software communicates with the informer engine 222 though various queries. To do so, the software places the query through an interprocess communication facility such as the well-known Unix types or message queues. The interprocess communication facility allows for efficient communication between active softwares. For example, a query from checker software 226 to informer engine 222 contains information required by the informer engine 222 to fulfill the query. The informer engine 222 responds to the query with the relevant information requested, sending this information to the process that sent the query though the interprocess communication facility. An environmental sensor is a sensor to monitor the environment, such as a temperature sensor.

Secondary storage device 232 contains a database 234 that interfaces with informer engine 222. Database 232 contains a device file 236 that includes configuration information for RMS server 104 and specific information regarding each service to be monitored at client site 120. For example device file 236 may contain the IP address of the device 124, the IRQ of environmental sensor 244, or errors to locate when parsing log files associated with each service.

Figure 2B:
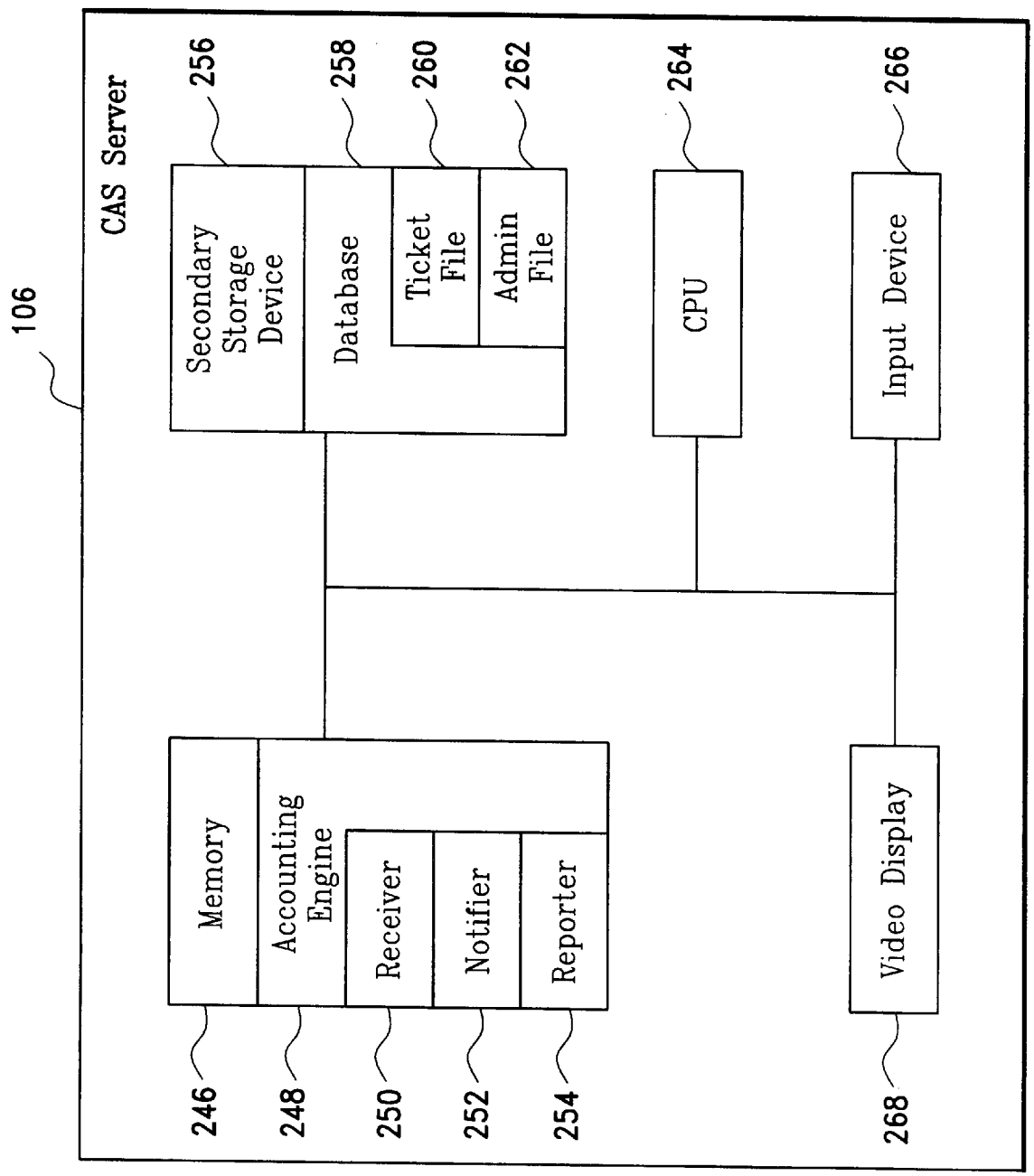
FIG. 2B depicts a more detailed diagram of a CAS server depicted in FIG. 1.

FIG. 2B depicts a more detailed diagram of CAS server 106. CAS server 106 contains a memory 246, a secondary storage device 256, a central processing unit ("CPU") 264, an input device 266, and a video display 268. Memory 246 includes accounting engine 248 that responds to information queries from various softwares. Accounting engine 248 includes receiver software 250 that receives tickets from RMS server 122 and places them in CMS database 258, notifier software 252 that analyzes CMS database 258 at regular intervals and, if data indicates a problem it notifies the proper personnel to resolve the problem, and reporter software 254 that generates reports, such as billing information, or the total number of problems recorded by RMS 122.

Secondary storage device 256 contains a database 258 that interfaces with accounting engine 248. CAS database 258 contains an administrator file 262 that contains information regarding technicians and sales personnel that should be notified when a ticket is received, and a ticket file 260 that contains pending tickets.

Figure 3:
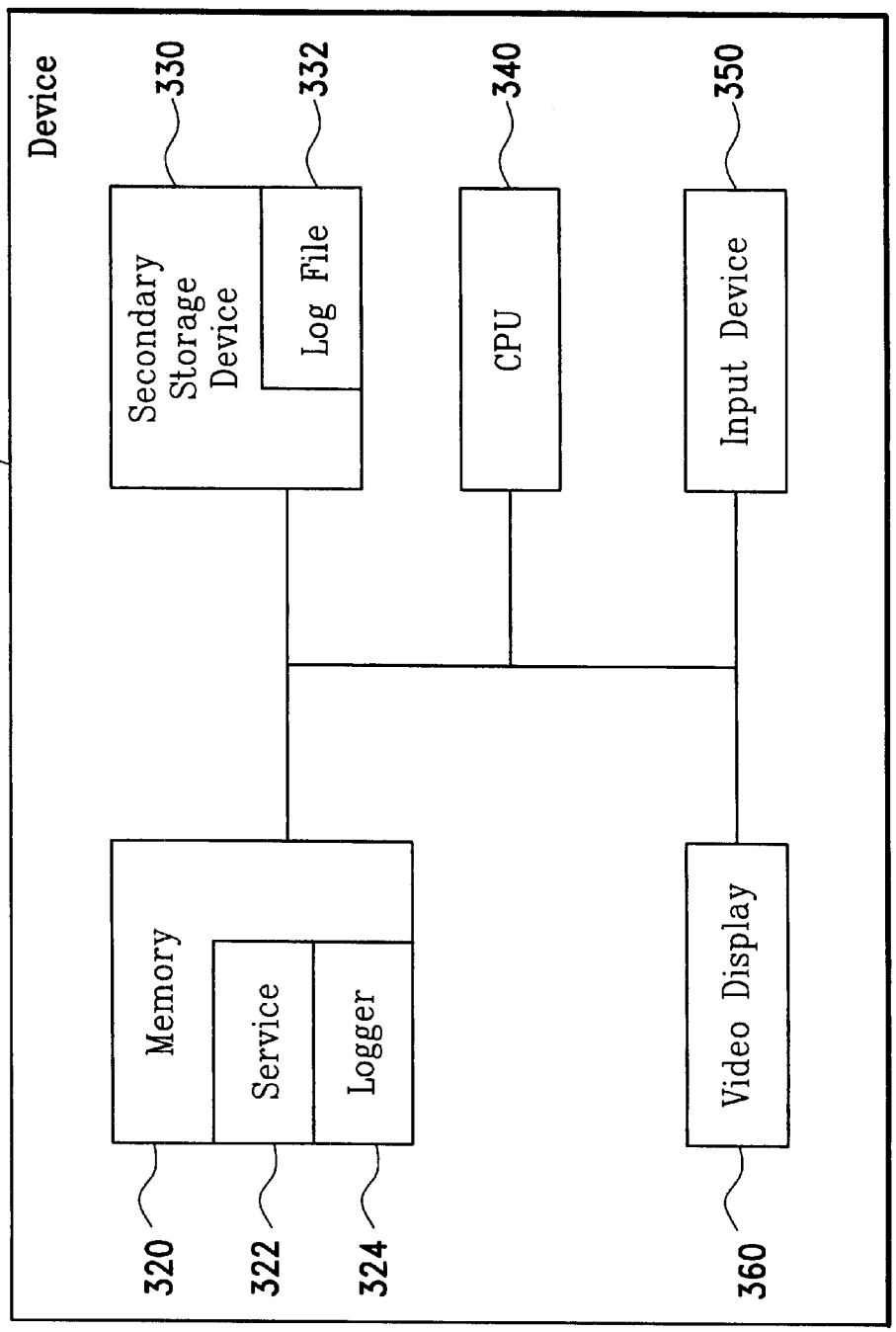
FIG. 3 depicts a more detailed diagram of a device depicted in FIG. 1.

FIG. 3 depicts a more detailed diagram of device 124. Device 124 contains a memory 320, a secondary storage device 330, a central processing unit ("CPU") 340, an input device 350, and a video display 360. Memory 320 includes a service 322 that provides access capabilities to device 124. For example, service 322 may be a well-known HTTPD service running on port 80. Service 322 may also be, for example, a routing deamon or SNMP interface. Memory 320 also includes logger program 324 that transmits various log files on device 124 when requested by RMS server 122 or CAS server 106. Secondary storage device 330 contains a log file 332 that records various events on device 124. For example, log file 332 may be a HTTPD access file, or a security access file.

Although aspects of the present invention are described as being stored in memory, one skilled in the art will appreciate that these aspects may be stored on or read from other computer-readable media, such as secondary storage devices, like hard disks, floppy disks and CD-ROM; a carrier wave received from a network like the Internet; or other forms of ROM or RAM. Additionally, although specific components and programs of RMS server 122 and CAS server 106 have been described, one skilled in the art will appreciate that these may contain additional or different components or programs.

Overview of the Network Monitoring Process

Figure 4:
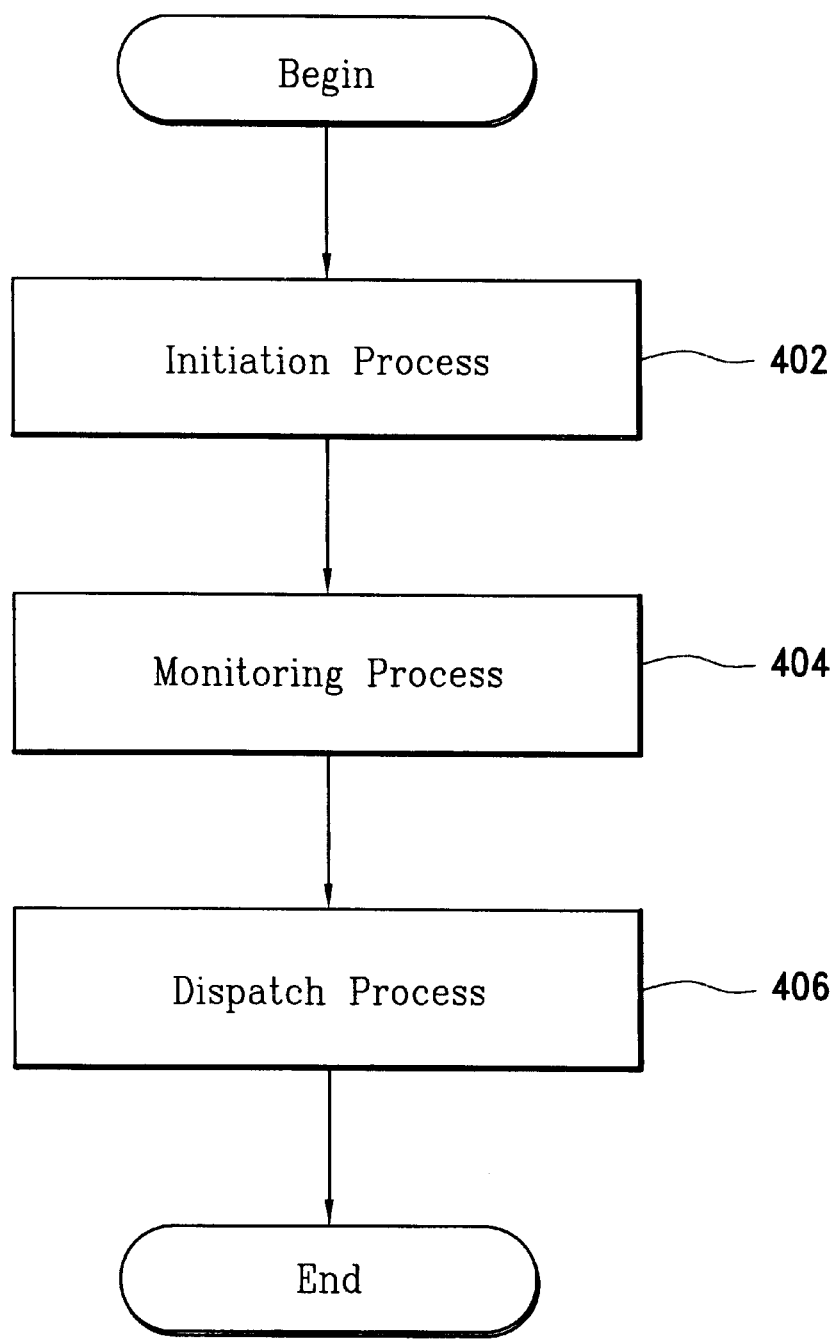
FIG. 4 depicts an overview flow chart of the steps performed by the data processing system of FIG. 1 when monitoring in accordance with methods and systems consistent with the present invention.

FIG. 4 depicts a flow chart of the steps performed by Network Monitoring System 100. The network monitoring process is initiated by the initiation process (step 402). The initiation process comprises loading of various softwares into memory on RMS server 122 and CAS server 106. Once the softwares are loaded, the monitoring process is started (step 404). This process entails monitoring various network services in devices 124, environmental conditional at the client site, and security services with a checker software. During the monitoring process, if a problem is detected with a service, the checker software notifies network operation site 102. Upon a successful notification, network operation site 102 determines an appropriate action, and dispatches a message containing possible solutions to the proper personnel (step 406). Network monitoring system 100 provides an automatic monitoring system that requires little or no user intervention to detect and diagnose any problem at client site 120.

Further details and operations of the network monitoring process will now be explained with reference to the flowcharts of FIGS. 5A–5C.

Initiation Process

Figure 5A:
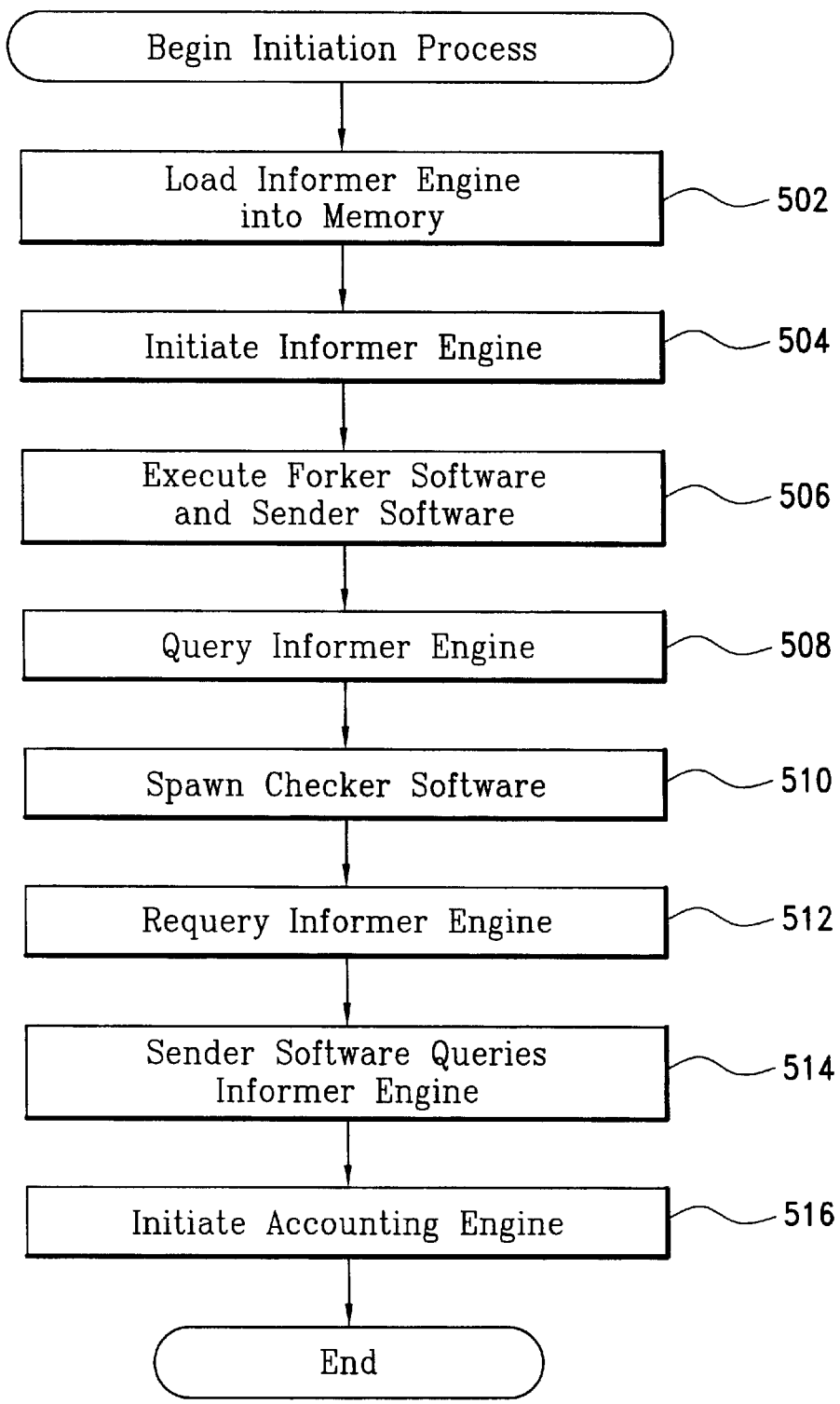
FIG. 5A depicts a flow chart of the steps performed by the initiation process of FIG. 4.

As shown in FIG. 5A, initiation process 402 is initiated, for example, by informer engine 222 loading into memory (step 502). For example, informer engine may be loaded from secondary storage device 430 to memory 420. Memory 420 contains enough space for informer engine 222 to execute and load necessary software and files. One skilled in the art will appreciate that informer engine 222 may be loaded by other means, such as a well-known PCMCIA memory flash card.

Once in memory, informer engine 222 is initiated (step 504) and executes forker software 224 and sender software 228 (step 506). Forker software 224 and sender software 228 remain in memory with informer engine 222. Also, informer engine 222 reads and loads device file 236 from database 234 into memory 420.

Forker software 224 begins execution by transmitting a query to informer engine 222 requesting a list of all services on device 124 to monitor at client site 120 (step 508). Informer engine 222 obtains this information by reading device file 234. Once obtained, informer engine 222 transmits the requested information to forker software 224. For example, if device file 234 contains an entry to monitor web and mail services on device 124, informer engine 222 may transmit a responses to forker software 224 that includes the port number of the web and mail services, and the physical address of device 124. Informer engine 222 may transmit the response as follows:

Port number: 80
Address: 200.2.8.10
Port number: 25
Address: 200.2.8.10

Once forker software 224 obtains this information from informer engine 222, forker software 224 spawns one checker software 226 for each service to monitor (step 510). Forker software 224 spawns multiple copies of the checker software so that RMS 122 may simultaneously monitor all services, thereby reducing the total time to completely monitor client site 120. For example, referring to the list mentioned above, forker software 224 spawns two copies of checker software 226 to monitor port 80 and port 25 at address 200.2.8.10. Forker software 224 transmits the address of device 124 and port to the corresponding spawned checker software 226. One skilled in the art will appreciate that other attributes may be used to identify the device and service, such as a protocol address, or machine address. Also, forker software 224 spawns a checker software to monitor environmental sensors 244 on RMS server 122.

Each spawned checker software transmits a query, similar to the forker query, to informer engine 222 (step 512). The query is a request for additional details regarding the service to monitor on device 124 or sensor information. The query includes the address and port of the service checker software 226 will be monitoring. In the case of a security service, the query may include information regarding the log file to obtain from device 124. For example, checker software 226 may need to know a list of errors to look for in the log file. For example, checker software 226 may parse the log file for multiple well-known ICMP packets or invalid routes in a routing log file. Similar to step 508, informer engine 222 obtains this information from device file 234 and transmits the information to checker software 226. For example, if checker software 226 requests additional information on the web service in device 200.2.8.10, informer engine 222 may transmit a responses to checker software 226 that includes the directory to store tickets, the frequency at which to query each service, the duration of monitoring, and the contact person. Informer engine 222 may transmit the response as follows:

Directory:/usr/ticket
Frequency: 5 minutes
Duration: infinite
Contact person: Joe Smith Once all copies of checker software are started, sender software 228 transmits a query to informer 222 that includes a request for a list of delivery methods and a corresponding data-key to be used when spawning deliverer software 230 and notifying CAS 106 from client site 120 (step 514). A data-key is a unique character string, such as "INTERNET" that is unique to a delivery method. Sender software 228 requires a delivery method and a data-key to spawn a new deliverer software 230. Similar to step 508, informer engine 222 responds with the data-keys to be used to send tickets to NOS 102, along with the order in which to try them. Sender software 228 attempts each delivery method using a deliverer software 230 in turn until one succeeds in sending a ticket to the NOS 102. For example, the first delivery method typically tried by deliverer software 230 is the Internet. However, if the Internet is unavailable, deliverer software 230 may attempt a second delivery method, such as a well-known POTS line. Informer engine 222 may transmit the response as follows to sender software 228:

data-key-order: Internet, POTS, RADIO

Each delivery method is associated with a data-key which provides different information. For example, the Internet delivery method requires an IP-address and port-number, whereas the POTS delivery method requires a phone-number, login, and password.

Also during initiation, CAS server 106 initiates accounting engine 248. Similar to the initiation of RMS 122, accounting engine 248 executes receiver software 250 and notifier software 252 (step 516). Receiver software 246 then queries accounting engine 248 for the location to place an incoming ticket. Accounting engine 248 reads administrator file 262 from database 258 for this information. Receiver software 246 may also receive information about notifier software 252 and where to notify personnel.

Once RMS 122 and CAS 106 are initiated, monitoring process 504 may begin.

Monitoring Process

Figure 5B:
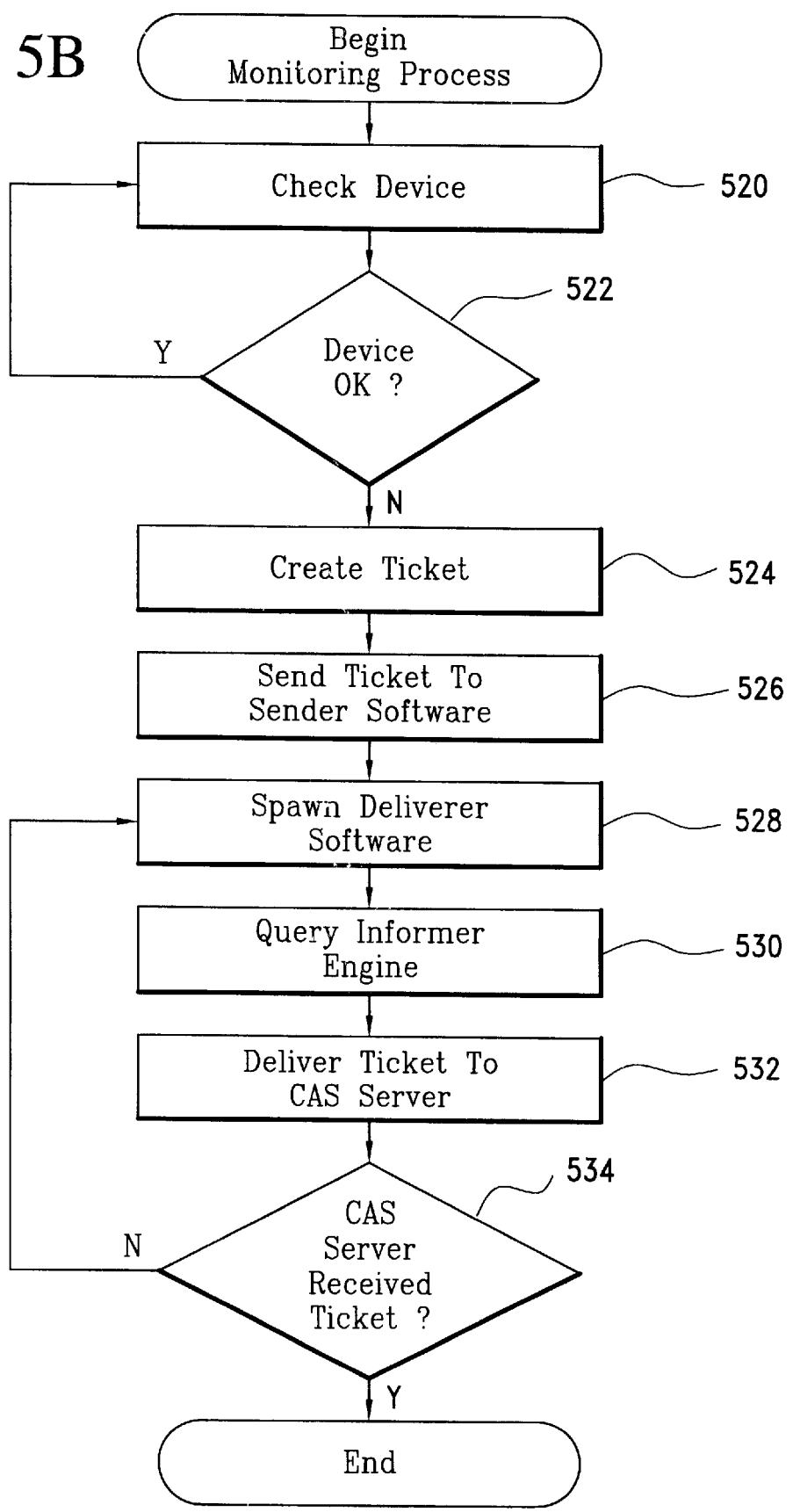
FIG. 5B depicts a flow chart of the steps performed by the monitoring process of FIG. 4.

As shown in FIG. 5B, after the initiation process is completed, the monitoring process begins. To monitor the services, checker software 226 may perform various techniques. In a first technique, checker software 226 may determine when a service 322 on device 124 does not respond (step 520). For example, checker software 226 may periodically open a web service on device 124. If the web service does not respond within 30 seconds, for example, checker software 226 determines that a problem exists with the web service. Checker software 226 may use any well-known method to check the availability of service 322 on device 124, such as ping, nmap, finger, or telnet.

In a second technique, checker software 226 may monitor environmental sensors 244. For example, if the temperature is too high, checker software 226 may determine that a problem exists with the environment. This information may be an indication that a problem exists and can be used as an indicator to larger problems.

In a third technique, checker software 226 may obtain log file 332 that corresponds to service 322 on device 124. In doing so, checker software 226 may parse log file 332 and locate a potential problem. For example, checker software 226 may receive a log file from a router that indicates that a particular route is not functioning. Although the router is responding, the log file would indicate an error.

Regardless of the method used, if checker software 226 detects a problem with service 322 on device 124 or an environmental sensor (step 522), checker software 226 creates a ticket (step 524). Otherwise checker software 226 rechecks the availability of the service again. FIG. 6 depicts an exemplary ticket 600 consistent with methods and systems of the present invention. Ticket 600 is created with SGML. Ticket 600 contains information that describes the problem with device 124 at a level of detail necessary for a technician to find the problem and correct it. For example, ticket 600 contains SGML tags 602 to identify a client site, the device location, the device address, and the service name that is malfunctioning. One skilled in the art will appreciate that ticket 600 may contain additional information and also may be written in different formats, such as comma delimited text, or database format.

Once ticket 600 is created, checker software 226 transmits ticket 600 embedded in a query to sender software 228 (step 526). Sender software 228 then delivers ticket 600 to CAS 106. To do so, sender software 228 spawns deliverer software 230 and sends ticket 600 embedded in a query and a data-key to deliverer software 230 (step 528). Deliverer software 230 uses the data-key to query informer engine 222 for information particular to the corresponding delivery method of the ticket (step 530). Once delivery software 230 receives the delivery method information from informer engine 222, deliverer software 230 sends ticket 600 to CAS 106 using the corresponding delivery method (step 532). For example, deliverer software 230 at client site 120 may transmit ticket 600 to CAS 106 over network 110. To do so, deliverer software 230 may connect to the receiver software 250 on CAS 106 using well-known sockets on the Internet. One skilled in the art will appreciate that deliverer software 230 may transmit ticket 600 to CAS 106 by other means, such as out-of-band communications, e-mail, ftp or HTTP.

Once transmitted, deliverer software 230 waits for a confirmation from CAS 106 that the ticket has been received (step 534). CAS 106 may confirm receipt by transmitting a reply response to the deliverer software 230. However, if confirmation is not received within a predetermined period of time, deliverer software 230 indicates a failed delivery attempt to the sender software 228. In response, sender software 228 spawns a new deliverer software 230 with a different method than used by the previous deliverer software 230. Again, deliverer software 230 waits for a confirmation from CAS 106 that the ticket has been received (step 534). Steps 528–534 may repeat until a confirmation is received from CAS 106. If, ultimately, a confirmation is never received, ticket 600 may be stored on secondary storage device 232 until communication with CAS 106 is re-established. When communications is reestablished, sender software 230 may attempt to deliver the ticket again.

Once ticket 600 is successfully delivered to CAS 106, dispatch process 406 may begin.

Dispatch Process

Figure 5C:
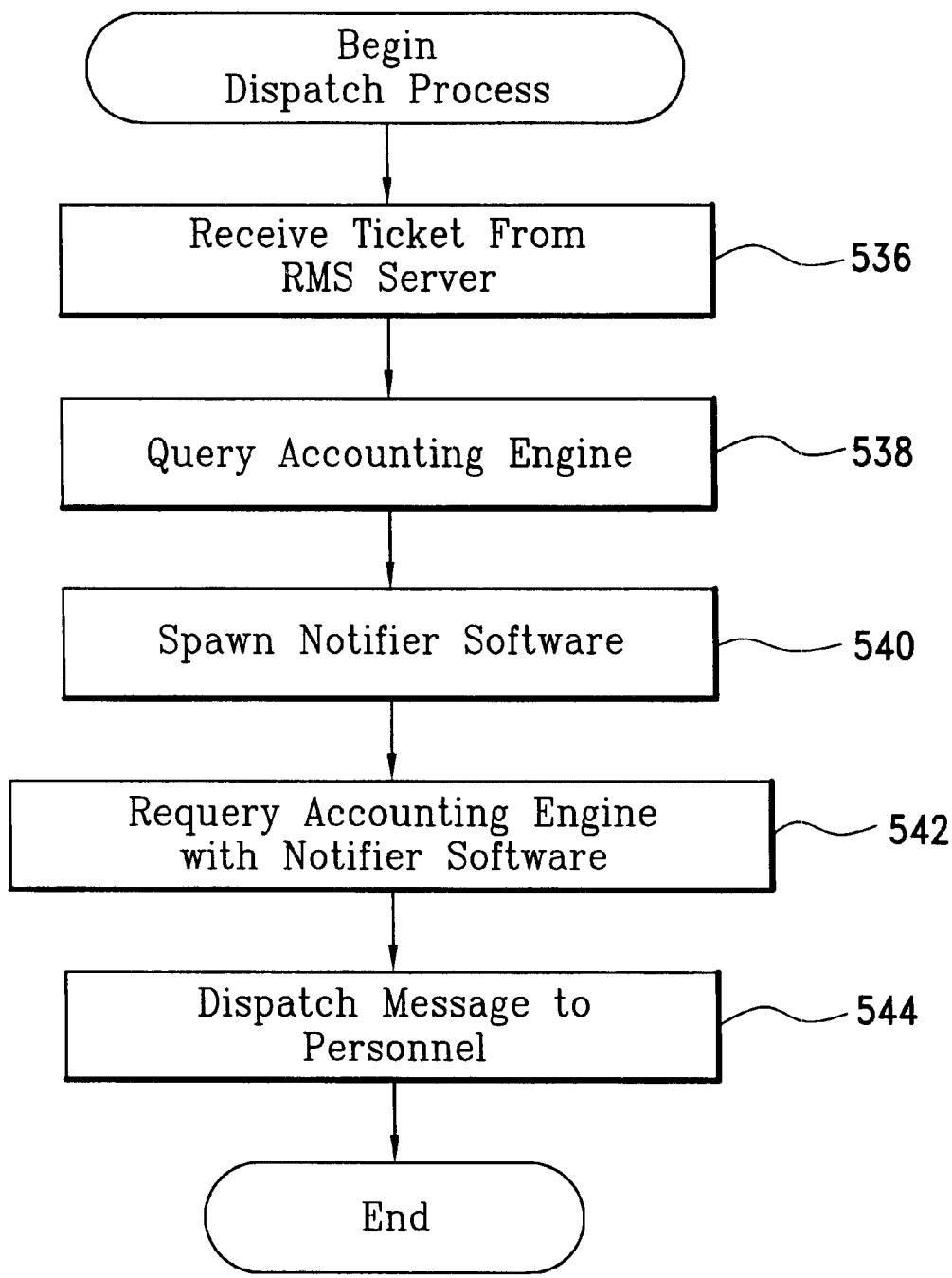
FIG. 5C depicts a flow chart of the steps performed by the dispatch process of FIG. 4.

As shown in FIG. 5C, once the ticket has been received by CAS 106, the dispatch process begins. The dispatch process begins, for example, by receiving ticket 600 at CAS 106 (step 536). Upon receipt of the ticket, receiver process 250 parses the ticket and uses the information in the ticket to query accounting engine 248 for information on where to place the pending ticket (step 538). For example, receiver software 250 may query accounting engine 248 with the IP address and port number of the service that is nonresponsive. Accounting engine 248 queries administrator file 262 for information regarding the service and responds with the location for ticket 600 in ticket file 260.

Once the location information is received, receiver process 250 spawns a copy of notifier software 252 (step 540). Notifier software 252 uses the information in the ticket to requery accounting engine 248 (step 542). Accounting engine 248 queries administrator file 262 and responds with the technical or sales personnel to be notified of the pending ticket and the method of notification to use. For example, if notifier software 252 queries accounting engine 248 with the IP and port address of a nonresponsive web service, accounting engine 248 may query administrator file 262 for a notification method. In administrator file 262 may be a preferred contact method for web services. Accounting engine 248 then responds to notifier software 252 with the notification information.

Once notifier software 252 receives the information from accounting engine 248, notifier software 252 immediately notifies the proper personnel (step 544). For example, if accounting engine 248 informs notifier software 252 that a Web Administrator should be notified by e-mail, notifier software 252 transmits an e-mail message to the Web administrator and includes all ticket information.

Logging Feature

Figure 7:
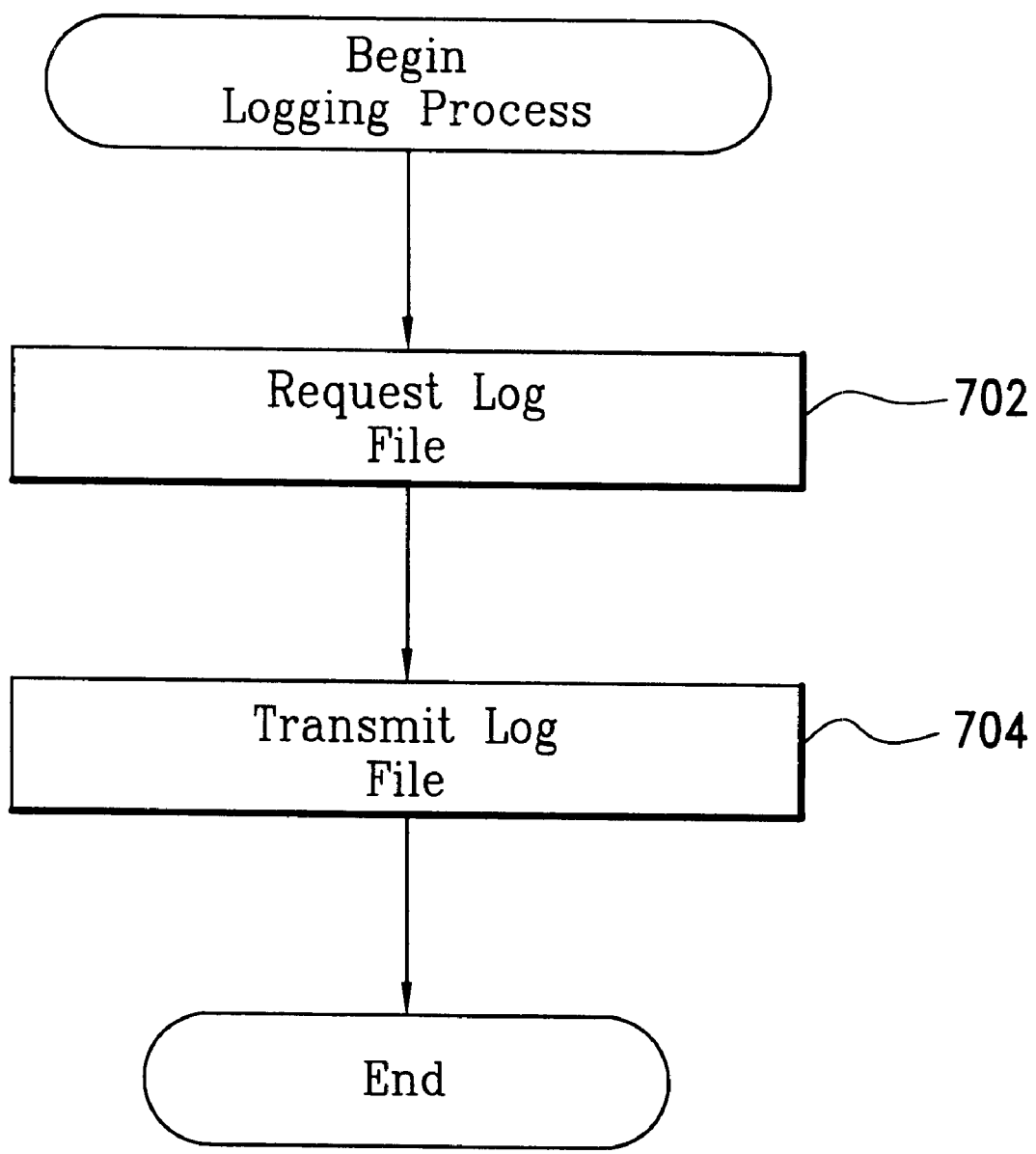
FIG. 7 depicts a flow chart of the steps performed by the logging process in accordance with methods and systems consistent with the present invention.

In addition to transmitting tickets to CAS 106, sender software 228 may also obtain log files 332 corresponding to service 322 on device 124. By obtaining log files associated with a particular service, CAS 106 may diagnose the problem with the service. As shown in FIG. 7, the logging process is initiated by sender software 228 transmitting a message to logger program 324 requesting a particular log file 332 (step 702). For example, if a web service is unavaibale on device 124, in addition to transmitting a ticket to CAS 106, sender software 228 may connect to port 5150 on device 124 and transmit a query to logger program 324 for the HTTP log files. This added feature provides necessary information to help diagnose the problem.

Once the request is received, logger program 324 locates the appropriate log file and transmits a portion of log file 332 to sender software 228 (step 704). For example, if device 124 is a well-known NT server, logger program 324 may transmit an event file. Once skilled in the art will appreciate that logger program 324 may transmit multiple log files or specific sections of any given log file.

Reporting Features

The reporter software 254 is an additional software used to audit and extract information from ticket file 260 to generate a report. Reporter software 260 analyzes CAS database 256 and generates reports, such as total tickets created, or billing information. FIG. 8 depicts a sample report created by reporting software 254 in accordance with methods and systems of the present invention.

These reports may be used to help detect patterns in problems experienced by a device which may in turn lead to the detection of larger scale problems, such intrusion or security breeches or network traffic anomalies. For example, if a series of tickets indicate that a security log file on an NT server has a flood of ICMP packets, a report may be created to locate all of the tickets that indicate this problem. One skilled in the art will appreciate that reporter software 254 may access ans parse ticket file 260 with well-known programs written in languages such as SQL.

Web Page Interface

RMS 122 may also contain a well-known web interface. The web interface provides the ability to create a manual ticket or a request for service. A user at client site 120 may use a web page on RMS 122 that can be accessed via any standard browser, such as Netscape Navigator. The web page is written in the well known Hypertext Markup Language, HTML, and can access PERL scripts located on a standard web server, such as the Apache web server. The information needed to be displayed by the Web page is obtained by querying informer engine 222. A ticket submitted by the Web page is similar to a ticket generated by checker software 226.

CONCLUSION

Methods and systems consistent with the present invention solve the limitations of current monitoring systems by automatically and completely monitoring various networks devices and services. Specifically, a network monitoring system monitors all services and conditions on various network. Moreover, the network monitoring system may provide an advance warning of potential failures and may diagnose any problems that may surface. Methods and systems consistent with the present invention can work well with systems written in C++, Perl, C or other programming languages such as Java.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware or software alone.

What is claimed is:

1. A method for monitoring a network with at least one service on the network, executed in a data processing system, comprising the steps of:

spawning a plurality of processes in a server for monitoring a plurality of services, wherein each spawned process is associated with at least one service on the network;

monitoring a service with a spawned process by receiving information from the service;

detecting a problem associated with the service; and notifying an accounting server when a problem is detected with the service by:

generating a data record by a spawned process, wherein the data record includes a device identification, a client identification and information identifying the problem associated with the service; and sending the data record to the accounting server.

2. The method of claim 1, wherein spawning a plurality of processes further includes:

querying an engine for the location of the service to monitor.

3. The method of claim 1, further includes the steps of:

monitoring an environmental sensor with the spawned process; and determining a problem exists with the environment based on information associated with the spawned process.

4. The method of claim 1, wherein monitoring a service further includes the step of:

sending a message from the process to the service to determine if a problem exists.

5. The method of claim 4, wherein detecting a problem with the service further includes the steps of:

determining whether the message was not received within a predetermined period of time; and determining that the service is nonresponsive when the message was not received within the predetermined period of time.

6. The method claim 4, wherein detecting a problem with the service further includes the step of:

receiving a response from the service indicating the status of the service; and obtaining additional information from the service when the response indicates that a problem exits.

7. The method of claim 6, wherein obtaining additional information further includes the steps of:

requesting a log file associated with the service;

receiving the log file; and parsing the log file for information regarding the status of the service.

8. The method of claim 7, further including the step of:

determining a status of a security service is functional based on information associates with the log file.

9. The method of claim 1, wherein notifying an accounting server further includes the steps of:

obtaining a log file associated with the service; and including the log file in a ticket.

10. The method of claim 1, further including the steps of:

dispatching a message that includes ticket identification information; and updating a database to indicate that a message has been dispatched.

11. The method of claim 1, wherein dispatching a message further includes the step of:

determining a method of dispatch associated with the technician by locating technician information in a database.

12. The method of claim 1, further including the steps of:

receiving a data record by a process associated with the accounting server;

identifying information associated with the data record; and storing the data record in a database.

13. The method of claim 12, further including the steps of:

monitoring the database for a new data record; and spawning a process to dispatch the new data record to an administrator.

14. The method of claim 12, further including the step of:

creating a report that includes at least one data record in the database.

15. A computer-readable medium containing instructions, for controlling a data processing system to perform a method for monitoring a network with at least one service on the network, comprising the steps of:

spawning a plurality of processes in a server for monitoring a plurality of services, wherein each spawned process is associated with at least one service on the network;

monitoring a service with a spawned process by receiving information from the service;

detecting a problem associated with the service; and notifying an accounting server when a problem is detected with the service by:

generating a data record by a spawned process, wherein the data record includes a device identification, a client identification and information identifying the problem associated with the service; and sending the data record to the accounting server.

16. A data processing system, comprising:

a memory containing a monitoring program that spawns a plurality of processes in a server for monitoring a plurality of services, wherein each spawned process is associated with at least one service on the network; that monitors a service with a spawned process by receiving information from the service, and in response to detecting a problem associated with the service, and that notifies an accounting server when a problem is detected with the service by: (a) generating a data record by a spawned process, wherein the data record includes a device identification, a client identification and information identifying the problem associated with the service; and (b) sending the data record to the accounting server; and a processor configured to run the monitoring program.

17. The method of claim 1, wherein notifying an accounting server further includes the step of:

transmitting a notification to the accounting server, wherein the notification is in an SGML format, XML format or comma delimited text format.

* * * * *